United States Patent
Dupuis et al.

(10) Patent No.: US 7,407,375 B2
(45) Date of Patent: Aug. 5, 2008

(54) ARRANGEMENT FOR REMOVEABLY FIXING A STRETCHING ROD ON A SLIDE

(75) Inventors: Pascal Dupuis, Octeville sur Mer (FR); Patrick Mie, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 236 days.

(21) Appl. No.: 10/583,133

(22) PCT Filed: Nov. 19, 2004

(86) PCT No.: PCT/EP2004/053018

§ 371 (c)(1),
(2), (4) Date: Jun. 16, 2006

(87) PCT Pub. No.: WO2005/068159

PCT Pub. Date: Jul. 28, 2005

(65) Prior Publication Data

US 2007/0108157 A1   May 17, 2007

(30) Foreign Application Priority Data

Dec. 19, 2003  (FR) .................................. 03 51122

(51) Int. Cl.
*B29C 49/12* (2006.01)

(52) U.S. Cl. ...................................... 425/182; 425/529
(58) Field of Classification Search ................. 425/182, 425/529
See application file for complete search history.

(56) References Cited

U.S. PATENT DOCUMENTS

| 4,050,876 | A | * | 9/1977 | Kauffman et al. | ............ 425/529 |
| 4,141,680 | A | * | 2/1979 | Kauffman et al. | ............ 425/529 |
| 4,284,397 | A | * | 8/1981 | Michel | ........................ 425/529 |
| 6,866,499 | B2 | * | 3/2005 | Ferguson et al. | ............ 425/529 |

FOREIGN PATENT DOCUMENTS

| FR | 2 720 678 A1 | 12/1995 |
| WO | WO 98/01284 A1 | 1/1998 |

* cited by examiner

*Primary Examiner*—Robert B Davis
(74) *Attorney, Agent, or Firm*—Young & Thompson

(57) ABSTRACT

An arrangement for removeably fixing a stretching rod (22) on a movable slide by an attachment device including a casing (24) and a bearing element (42) clamped onto the rod (22), characterized in that the top end section of the bearing element (42) is formed by at least two radial lugs (64) of rounded profile, in transverse section, which form a top transverse bearing surface (44), and in that the transverse profile formed by the peripheral edge (65) of the top opening (36) of the casing (24) substantially matches the profile of the lugs (64).

10 Claims, 3 Drawing Sheets

ARRANGEMENT FOR REMOVEABLY FIXING A STRETCHING ROD ON A SLIDE

The invention relates to an arrangement for removeably fixing a stretching rod in a stretch-blow moulding machine.

This type of machine is used for the manufacture of receptacles, and particularly of bottles, made of plastic, for example polyethylene terephthalate (PET), from preforms that are made bottle-shaped by a stretch-blow moulding operation.

The invention relates more particularly to an arrangement for the removable attachment of a stretching rod on a movable slide belonging to a machine for stretch-blow moulding a preform for the manufacture of receptacles, of the type in which the slide is mounted so as to slide relative to a support along a substantially vertical axis above the opening of the preform, of the type in which the stretching rod is attached to the slide by means of an attachment device comprising:

- a casing that is attached to the slide, that is furnished with a top transverse partition and a bottom transverse partition axially delimiting an internal housing, each partition comprising an axial opening allowing an associated section of the stretching rod to pass through,
- a bearing element that comprises several circumferential portions radially clamped onto a section of the stretching rod, that is designed to be inserted axially inside the housing of the casing while passing through the top axial opening of the casing, and that comprises a top transverse surface designed to come to bear axially against a portion of the bottom inner face of the top transverse partition of the casing during the stretching step, and a bottom transverse surface designed to come to bear axially against a portion of the top inner face of the bottom transverse partition of the casing in order to hold the rod axially down in the casing, so that the stretching rod can be attached to the slide by a mount of the bayonet type, the rod being inserted axially, with the bearing element, in the casing, and the rod being pivoted about its axis, from an angular insertion position to an angular mounted position, to place a portion of the top transverse surface of the bearing element facing the associated inner face of the casing.

This type of arrangement is particularly useful for allowing the rapid changing of the drawing rod on each stretching station of a stretch-blow moulding machine, according to the type of preform used and according to the type of bottle that it is desired to manufacture. Specifically, thanks to this arrangement, it is possible to have stretching rods of predetermined lengths, comprising an attachment device that is preset in height, which makes it possible to eliminate adjustment operations on the machine, and therefore to limit the machine shutdown phases.

Usually, in this type of arrangement, the bearing element, called a clamp, is made in two symmetrical parts together forming a rectangular parallelepiped, when they are clamped onto the drawing rod.

The opening of the casing has a rectangular shape matching the bearing element. The bearing element can thus be inserted axially into the casing, with the drawing rod, then be turned a quarter turn so that the top face of the parallelepiped can come to bear axially, via its two transverse end portions, on the inner face of the casing facing it during the drawing phase.

This type of arrangement is not completely satisfactory because, during the drawing phase, the bearing element comprises a relatively limited axial contact area on the casing, which induces considerable mechanical forces, particularly bending forces, on the bearing element.

In addition, the positioning of the bearing element in the casing requires a quarter turn rotation, which may constitute a relatively large angular travel, taking account of the various manual operations that must be carried out during the changing of the drawing rod on the stretch-blow moulding machine. In particular, this angular travel must be repeated on all the stretch-blow moulding stations that the machine comprises.

The invention aims to remedy these disadvantages by proposing a simple, effective and economic solution.

For this purpose, the invention proposes an arrangement of the type previously described, characterized in that the top end section of the bearing element is formed by at least two radial lugs of rounded profile, in transverse section, the top transverse bearing surface being formed by the top transverse face of the lugs, and in that the transverse profile formed by the peripheral edge of the top opening of the casing substantially matches the profile of the lugs.

According to other features of the invention:

- the bearing element comprises a bottom end cylindrical section whose diameter is less than the maximum transverse dimension of the top section and is greater than the diameter of the bottom axial opening of the casing, so that the bottom transverse face of the cylindrical section comes to bear axially against the inner face of the bottom transverse partition of the casing;
- the top section of the bearing element comprises four similar radial lugs;
- the bearing element is made in two parts that are substantially symmetrical relative to an axial plane;
- each part comprises two radial lugs;
- the two parts are radially clamped against the associated section of the stretching rod by means of at least one clamping screw which extends in a direction substantially orthogonal to a diameter of the stretching rod;
- the radial lugs are distributed angularly in an even manner;
- a section of the bearing element comprises an outer orifice for angular immobilization that is designed to receive, through a hole made in a side wall of the casing, a matching locking finger in order to immobilize the bearing element in its mounted position.

Other features and advantages of the invention will appear on reading the following detailed description for the understanding of which reference will be made to the appended drawings in which.

For the description of the invention, the vertical and transverse orientations will be adopted in a non-limiting manner according to the V, T markings indicated in the figures.

In the following description, identical, similar or analogous elements will be indicated by the same reference numbers.

Figure 1:
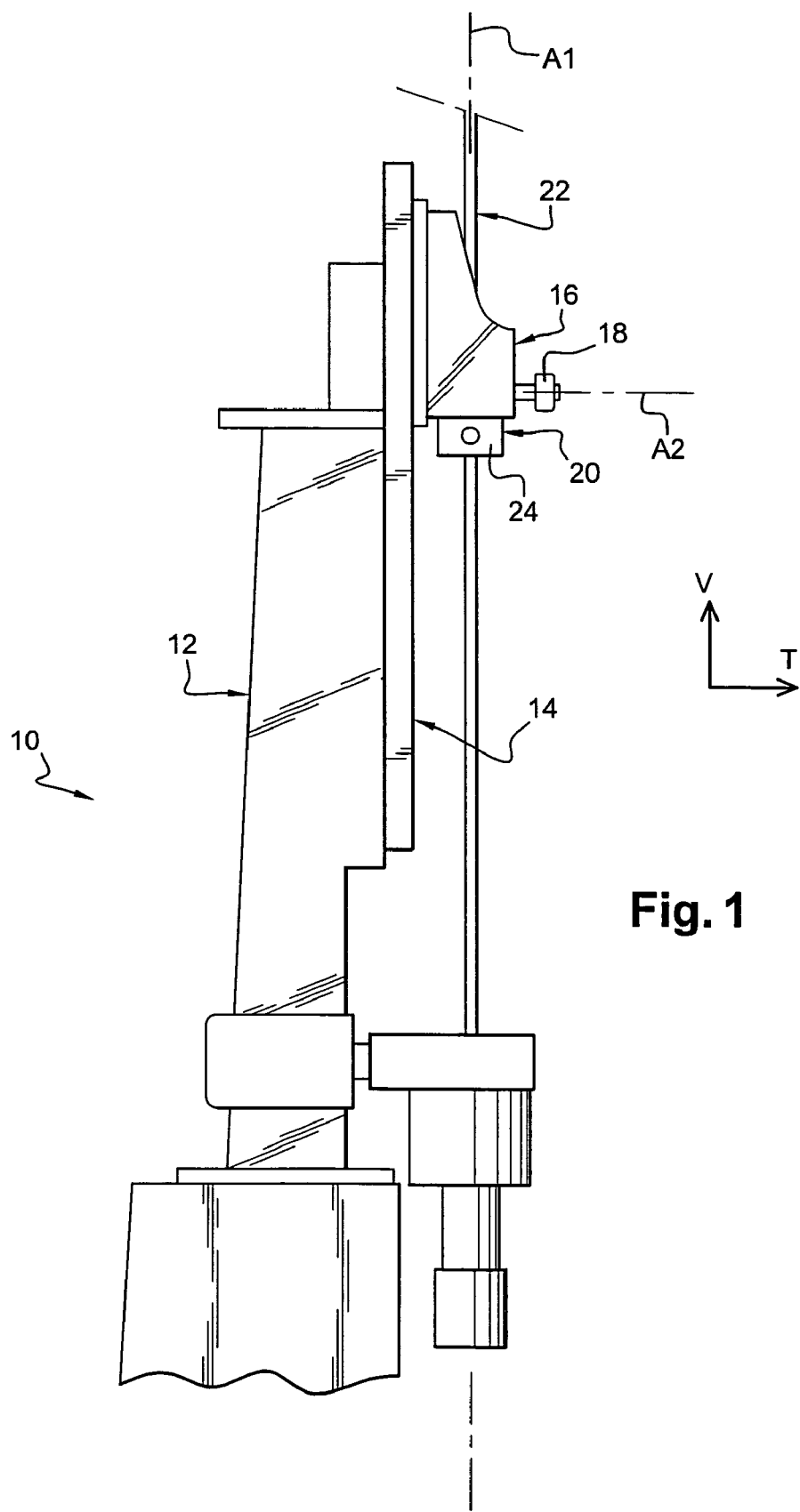
FIG. 1 is a view in perspective that represents schematically a stretch-blow moulding station fitted with an arrangement for the removable attachment of a drawing rod on a slide made according to the teachings of the invention.

FIG. 1 shows in part a stretch-blow moulding station 10 of a stretch-blow moulding machine for the manufacture of receptacles made of thermoplastic by stretch-blow moulding a preform in a mould.

In a conventional manner, the stretch-blow moulding station 10 comprises a gantry 12 that is furnished with a vertical rail 14 onto which a slide 16 is mounted so as to be slidingly movable along a vertical stretching axis A1.

The movements of the slide 16 are controlled here by a guide roller 18 that is mounted free to rotate about a transverse axis A2 and that interacts with a fixed cam (not shown) by rolling.

The stretch-blow moulding station 10 comprises a device 20 for the removable attachment of a stretching rod 22, also called a drawing rod, on the slide 16.

In FIG. 1, the stretching rod 22 is shown mounted on the slide 16.

The bottom axial end of the stretching rod 22 is designed to be inserted axially into a preform (not shown), through its opening, arranged vertically under the slide 16, in order to stretch the preform vertically downwards, during a part of the phase of moulding the receptacle.

The device 20 for attaching the stretching rod 22 comprises a casing 24 that is attached here to the bottom face of the slide 16, for example by means of screws.

Figure 2:
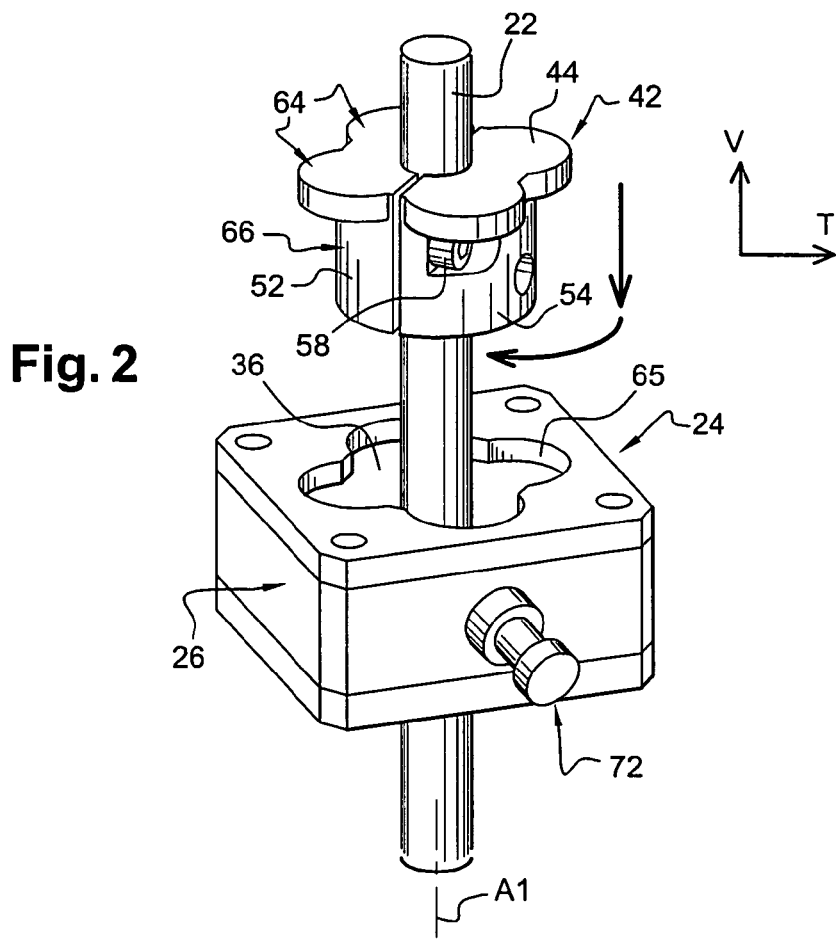
FIG. 2 is a partially exploded view in perspective that represents a drawing rod fitted with a bearing element designed to be inserted into a casing belonging to the arrangement according to the invention.
Figure 3:
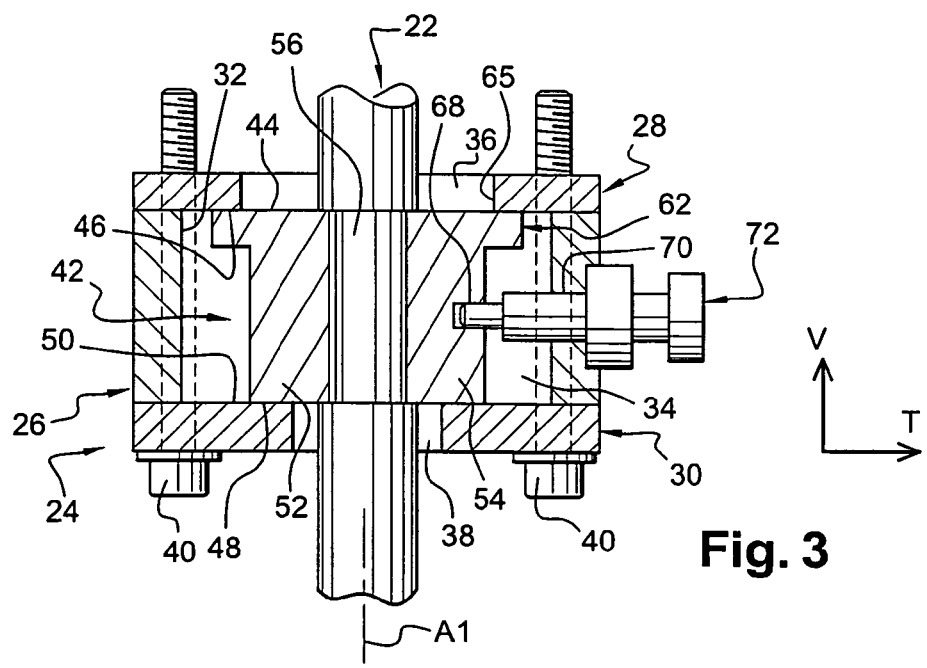
FIG. 3 is a view along the sectional plane 3-3 that represents the drawing rod and the bearing element in the mounted and locked position in the casing.

As can be seen more particularly in FIGS. 2 and 3, the casing 24 here has the shape of a square parallelepiped that comprises an intermediate body 26 of square cross section, that is clamped axially between a top transverse partition 28 and a bottom transverse partition 30 in the form of plates.

The intermediate body 26 comprises a substantially cylindrical central duct 32, coaxial with the stretching axis, that radially delimits a housing 34 inside the casing 24 (FIG. 3).

The housing 34 is delimited axially (A1) by the two partitions 28, 30.

Each partition 28, 30 comprises a respective axial opening 36, 38 to allow an associated section of the rod 22 to pass through.

FIG. 3 shows two vertical screws 40 that are used to attach the casing 24 to the slide 16, by axially clamping the intermediate body 26 between the two partitions 28, 30.

Preferably, in order to offer better resistance to the forces, four vertical screws 40 are present.

A bearing element 42, or clamp, that is attached to the stretching rod 22, is designed to be inserted axially with the rod 22 into the housing 34 of the casing 24 by passing through the top axial opening 36.

The bearing element 42 comprises a top transverse surface 44 that is designed to come to bear axially against a portion of the bottom inner face 46 of the top transverse partition 28, during the stretching step, and a bottom transverse surface 48 that is designed to come to bear axially against a portion of the top inner face 50 of the bottom transverse partition 30 in order to keep the rod 22 axially down in the casing 24.

Figure 4:
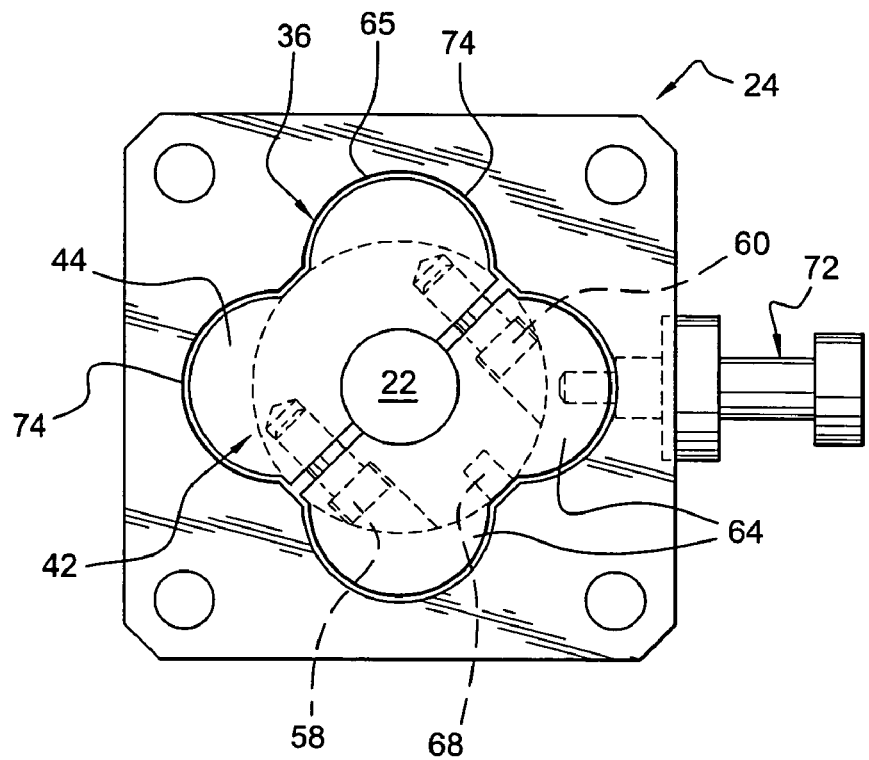
FIG. 4 is a top view that represents the drawing rod and the bearing element in the angular insertion position in the top opening of the casing.
Figure 5:
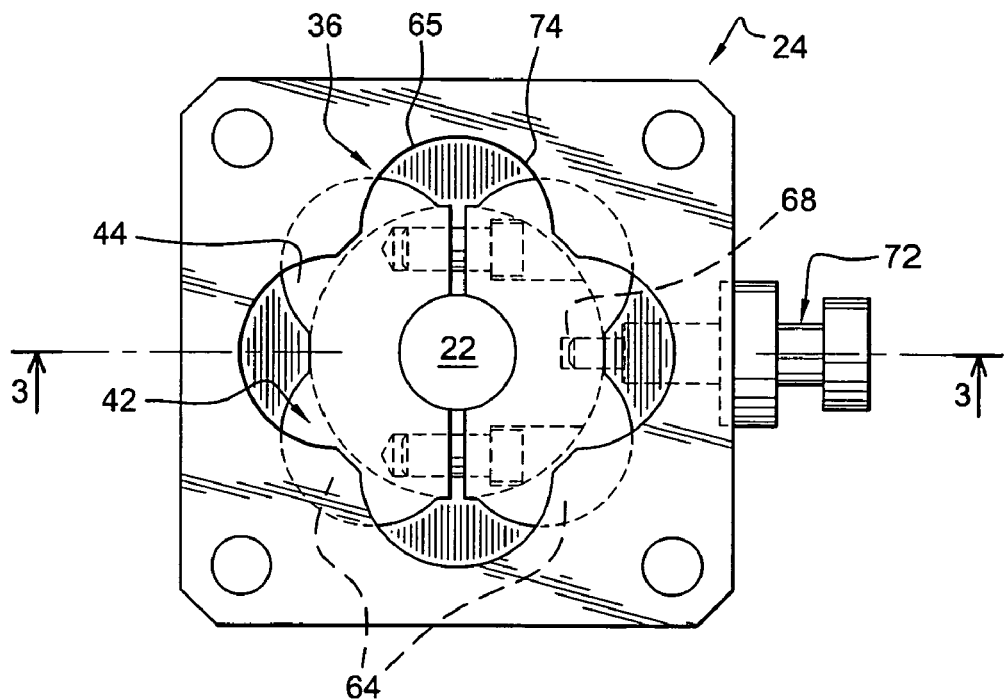
FIG. 5 is a view similar to that of FIG. 4 that represents the drawing rod and the bearing element in the angular mounted and locked position in the casing.

According to the embodiment represented here, the bearing element 42 comprises two circumferential portions 52, 54 that are substantially symmetrical relative to an axial plane and that are radially clamped onto a section 56 of the stretching rod 22, here by means of two parallel transverse screws 58, 60 shown in FIGS. 4 and 5.

The transverse screws 58, 60 each extend in a direction orthogonal to a diameter of the rod 22.

The section 56 of the rod 22 designed for the attachment of the bearing element 42 here has a diameter smaller than the average diameter of the rod 22, so that it is delimited axially by two shoulders.

The bearing element 42 here has an axial dimension that is substantially equal to that of the attachment section 56 and to that of the housing 34.

According to the teachings of the invention, the top end section 62 of the bearing element 42 is formed by at least two radial lugs 64 of rounded profile, in transverse section, the top transverse bearing surface 44 being formed by the top transverse face of the lugs 64.

According to another feature of the invention, the transverse profile formed by the peripheral edge 65 of the top opening 36 of the casing 24 substantially matches the profile of the lugs 64.

According to the embodiment represented here, each portion 52, 54 of the bearing element 42 comprises two similar radial lugs 64.

The lugs 64 here are symmetrical two by two relative to an axial plane and they have a rounded profile of the same radius.

Preferably, the radial lugs 64 are distributed angularly in an even manner about the rod 22.

Advantageously, the bearing element 42 comprises a bottom end cylindrical section 66 whose diameter is less than the maximum transverse dimension of the top section 62 and is greater than the diameter of the bottom axial opening 38 of the casing 24, which here has a circular cross section.

The bottom end surface of the cylindrical section 66 constitutes the bottom transverse bearing surface 48 of the bearing element 42.

According to the embodiment represented here, the cylindrical section 66 extends over the majority of the axial length of the bearing element 42, and the top section 62 overall forms a plate at the top end of the cylindrical section 66.

Preferably, the cylindrical section 66 comprises, in one of the circumferential portions 54, an outer radial orifice 68 for angular immobilization that is designed to receive, through a radial hole 70 arranged in the intermediate body 26, a matching locking finger 72, in order to angularly immobilize the bearing element 42 in the mounted position in the housing 34.

The operation of the attachment device 20 according to the invention will now be explained, particularly with reference to FIGS. 4 and 5.

The bearing element 42 is first attached to the rod 22, then the rod 22 is inserted axially from the top, with the bearing element 42, into the housing 24 through the top opening 36, according to a mounting of the bayonet type.

For this insertion to be possible, it is necessary to angularly position the rod 22 and the bearing element 42, relative to the top opening 36, so that the radial lugs 64 are opposite the matching recesses 74 formed by the edge 65 of the opening 36, as shown in FIG. 4.

During the insertion, the locking finger 72 must also be radially shifted outwards so as to allow the cylindrical section 66 to pass through.

Once the bearing element is fully received in the housing 34, the rod 22 is made to pivot about its axis A1 by an eighth of a turn, so that the radial lugs 64 come to be placed partially beneath the top partition 28 of the casing 24, as shown in FIG. 5.

The radial orifice 68 for angular immobilization is then angularly opposite the locking finger 72, which can then slide radially into the radial orifice 68, for example under the effect of a return spring (not shown).

The rod 22 and its bearing element 42 then occupy the mounted position in the casing 24, thereby making it possible to carry out stretching operations.

During the stretching phase, the portions of the top surface 44 of the radial lugs 64 that are beneath the top partition 28 come to bear axially against this partition 28, thereby making it possible to accept the axial forces that are applied to the rod 22.

According to the embodiment represented here, the bearing element 42 comprises a single radial orifice 68 for angular locking, so that there is only one mounted and locked angular position. This feature may be useful, particularly in the case of a drawing rod 22 comprising an internal blow-moulding duct, since this type of rod 22 comprises only one angular mounting position.

According to a variant embodiment (not shown), the bearing element may comprise several radial orifices 68 for angular locking, distributed angularly in an even manner, in order to allow several angular mounting and locking positions.

The invention claimed is:

1. Arrangement for the removable attachment of a stretching rod (22) on a movable slide (16) belonging to a machine (10) for stretch-blow moulding a preform for the manufacture of receptacles, of the type in which the slide (16) is mounted so as to slide relative to a support (12) along a substantially vertical axis (A1) above the opening of the preform, of the type in which the stretching rod (22) is attached to the slide (16) by means of an attachment device (20) comprising:
   - a casing (24) that is attached to the slide (16), that is furnished with a top transverse partition (28) and a bottom transverse partition (30) axially delimiting an internal housing (34), each partition (28, 30) comprising an axial opening (36, 38) allowing an associated section of the stretching rod (22) to pass through,
   - a bearing element (42) that comprises several circumferential portions (52, 54) radially clamped onto a section (56) of the stretching rod (22), that is designed to be inserted axially inside the housing (34) of the casing (24) while passing through the top axial opening (36) of the casing (24), and that comprises a top transverse surface (44) designed to come to bear axially against a portion of the bottom inner face (46) of the top transverse partition (28) of the casing (24) during the stretching step, and a bottom transverse surface (48) designed to come to bear axially against a portion of the top inner face (50) of the bottom transverse partition (30) of the casing (24) in order to hold the rod (22) axially down in the casing (24), so that the stretching rod (24) can be attached to the slide (16) by a mount of the bayonet type, the rod (22) being inserted axially, with the bearing element (42), in the casing (24), and the rod (22) being pivoted about its axis (A1), from an angular insertion position to an angular mounted position, to place a portion of the top transverse surface (44) of the bearing element (42) facing the associated inner face (46) of the casing (24)
   characterized in that the top end section (62) of the bearing element (42) is formed by at least two radial lugs (64) of rounded profile, in transverse section, the top transverse bearing surface (44) being formed by the top transverse face of the lugs (64), and in that the transverse profile formed by the peripheral edge (65) of the top opening (36) of the casing (24) substantially matches the profile of the lugs (64).

2. Arrangement according to claim 1, characterized in that the bearing element (42) comprises a bottom end cylindrical section (66) whose diameter is less than the maximum transverse dimension of the top section (62) and is greater than the diameter of the bottom axial opening (38) of the casing (24), 50 that the bottom transverse face (48) of the cylindrical section (66) comes to bear axially against the inner face (50) of the bottom transverse partition (30) of the casing (24).

3. Arrangement according to claim 1, characterized in that the top section (62) of the bearing element (42) comprises four similar radial lugs (64).

4. Arrangement according to claim 3, characterized in that the bearing element (42) is made in two parts (52, 54) that are substantially symmetrical relative to an axial plane.

5. Arrangement according to claim 3, characterized in that each part (52, 54) comprises two radial lugs (64).

6. Arrangement according to claim 4, characterized in that the two parts (52, 54) are radially clamped against the associated section (56) of the stretching rod (22) by means of at least one clamping screw (58, 60) which extends in a direction substantially orthogonal to a diameter of the stretching rod (22).

7. Arrangement according to claim 1, characterized in that the radial lugs (64) are distributed angularly in an even manner.

8. Arrangement according to claim 1, characterized in that a section (66) of the bearing element (42) comprises a radial orifice (68) for angular immobilization that is designed to receive, through a hole (70) made in a side wall (26) of the casing (24), a matching locking finger (72) in order to immobilize the bearing element (42) in its mounted position.

9. Arrangement according to claim 5, characterized in that the two parts (52, 54) are radially clamped against the associated section (56) of the stretching rod (22) by means of at least one clamping screw (58, 60) which extends in a direction substantially orthogonal to a diameter of the stretching rod (22).

10. Arrangement according to claim 1, characterized in that the bearing element (42) is made in two parts (52, 54) that are substantially symmetrical relative to an axial plane.

* * * * *